Nov. 13, 1928.  1,691,583
C. PEARSON
TRANSPORT TRUCK
Filed June 18, 1923   2 Sheets-Sheet 1
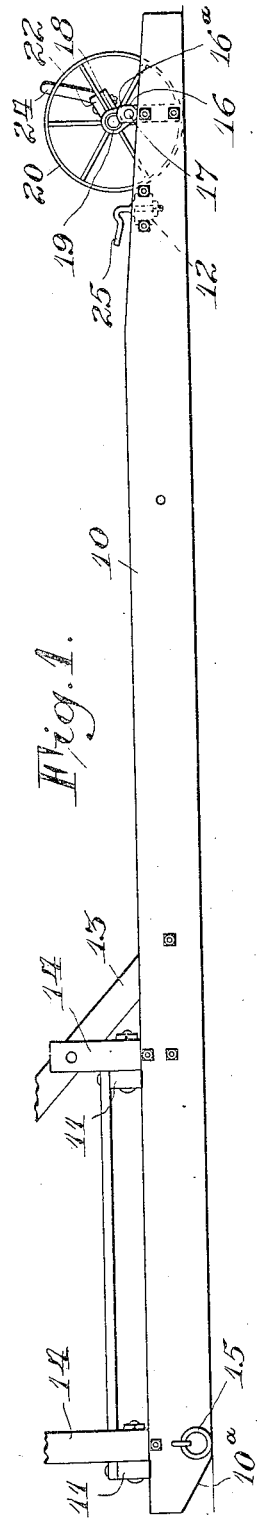
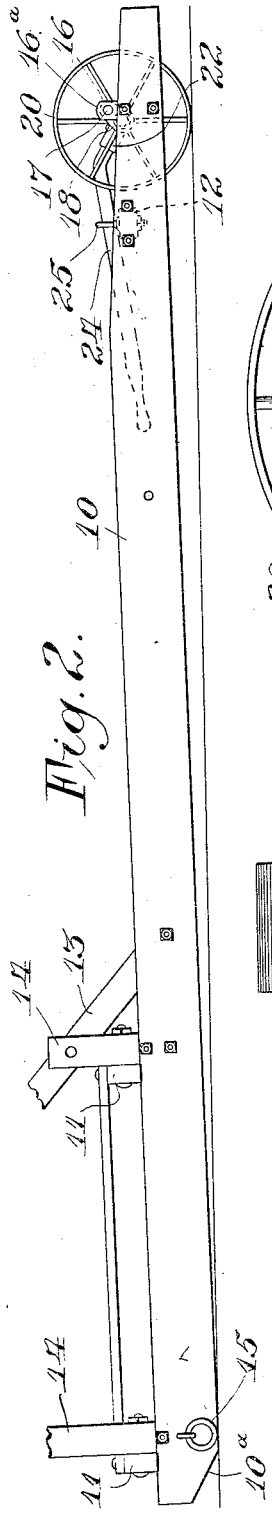
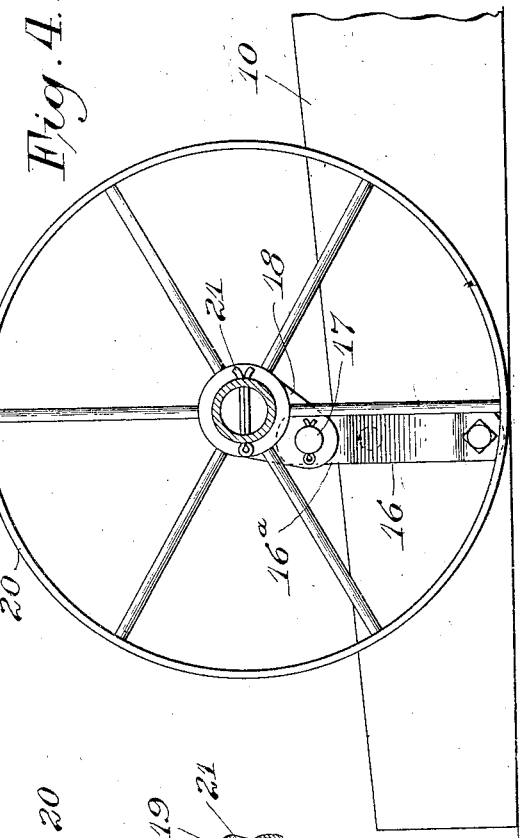
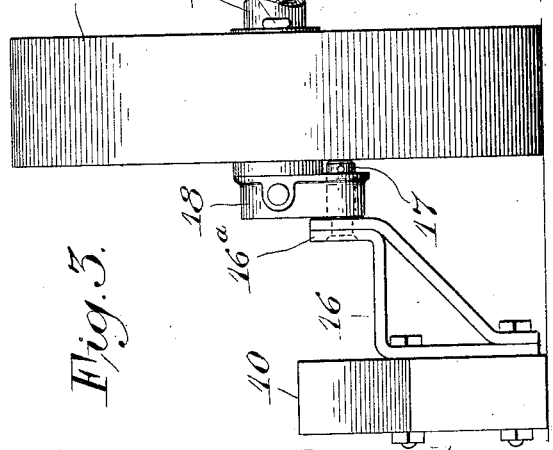
Inventor.
Charles Pearson,
By N.P. Daalib
Atty.

Nov. 13, 1928.
C. PEARSON
1,691,583
TRANSPORT TRUCK
Filed June 18, 1923  2 Sheets-Sheet 2
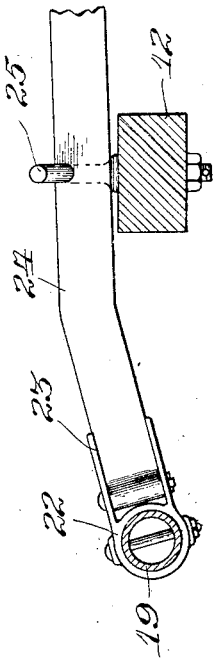
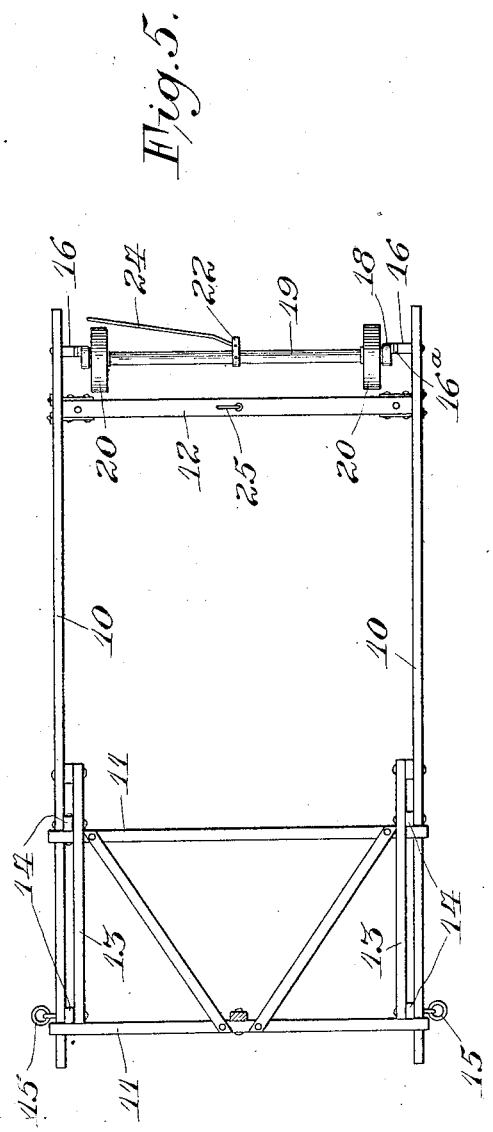
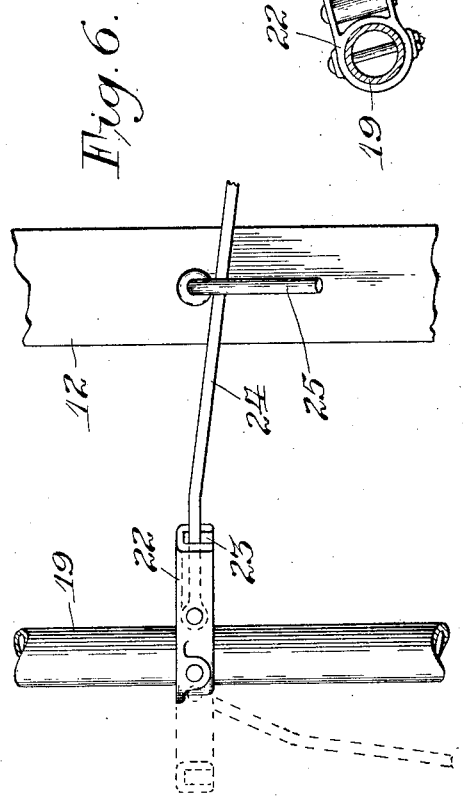
Inventor.
Charles Pearson,
By *H. P. Davitt*,
Atty.

Patented Nov. 13, 1928.

1,691,583

UNITED STATES PATENT OFFICE.

CHARLES PEARSON, OF CHICAGO, ILLINOIS, ASSIGNOR TO INTERNATIONAL HARVESTER COMPANY, OF CHICAGO, ILLINOIS, A CORPORATION OF NEW JERSEY.

TRANSPORT TRUCK.

Application filed June 18, 1923. Serial No. 646,039.

This invention is directed to improvement in transport trucks for implements of the type having a base comprising side sills or skids which rest on the ground when the implement is in use. In the present instance the invention is illustrated as applied to the base of a hay-stacker which has long side sills normally resting on the ground, the transport of the stacker being greatly facilitated by making it possible to raise one end of the skids on rollers or wheels when the draft is applied to the other end to move the implement.

The principal object of the invention, therefore, is to provide a wheeled support for an implement of the kind stated, that can be readily adjusted to raise and lower the skids or sills and that is simple and durable in construction. The invention accordingly resides in the combination and arrangement of parts, or the equivalents thereof, hereinafter more particularly described and claimed.

In the drawings—

Figs. 1 and 2 are side views of a stacker base showing the truck comprising the invention in raised and lowered position respectively;

Fig. 3 is a detail front view showing the manner of mounting the truck axle;

Fig. 4 is a similar side view of the axle mounting as seen from the inside of the sill;

Fig. 5 is a plan view of a stacker base including the invention; and

Figs. 6 and 7 are detail views from the top and side showing the adjusting lever and latching means.

The device of my invention is shown in combination with a stacker base comprising the side sills or skids 10 connected by rear cross members 11 and front cross member 12. The rear portion of the base is suitably braced as by the members 13 and has secured thereto standards 14 on which the members of a lifting frame (not shown) are mounted. The side sills have their front ends beveled as at 10ª to enable them to act as runners during transport and rings 15 are attached to the forward ends of the sills for use as draft engaging means and also to receive anchoring pins when necessary. When the lifting frame of the stacker is in lowered position, it projects beyond the rear ends of the sills 10 and the greater part of the weight of the implement bears on the rear ends of the sills. At this point, therefore, there is secured to the inner side of each sill a bearing bracket 16 formed with an upright portion 16ª to which there is fixed the inwardly extending pintle 17. On each side of these pintles there is journaled a crank arm 18 carrying the axle 19 rigidly secured thereto. Adjacent each crank arm 18 there is a roller or wheel 20 journaled on the axle and retained in position by suitable means such as the cotter pin 21. It will be evident that the structure just described provides a cranked axle and wheels so proportioned that when the cranked axle is swung upward, the sills will rest on the ground and when swung downward the sills will be raised and the weight will rest on the wheels 20 as clearly shown in Figs. 1 and 2. In order to effect the raising and lowering of the sills and retain them in raised position, there is provided a radial arm 22 which is securely fastened to the middle of the axle 19 and formed with a longitudinal groove 23 in one side. An operating lever 24 is pivoted on arm 22 at the inner end of the groove 23 and when the lever is extended radially its lower portion is engaged in and braced by the walls of the groove. When not in use, the lever may be folded over toward the axle 19 as shown in Fig. 5 and in dotted lines in Fig. 6. As means for locking the lever 24 to retain the sills in raised position, the cross member 12 has a swinging latch 25 pivoted in a vertical opening at its middle in position to engage the lever 24 when the axle has been swung downwardly, at which time the extended lever will lie across the bar 12, as seen in Figs. 2 and 6, when the latch member 25 can be swung around over the lever to secure it and the axle in adjusted position. To lower the skids, the latch is turned in reverse direction releasing the lever and allowing the axle to turn to upward position when lever 24 can be folded over toward the axle and out of the way.

The mode of operation will be evident from the description given above and it is clear that a simple and durable transport truck for carrying the principal weight of a stacker has been devised and that certain variations are possible in the details of its construction within the scope of the following claims.

I claim as my invention:

1. A transport device for hay-stackers comprising a crank axle having its ends journaled in the base frame of the hay-stacker, two ground wheels journaled on the crank portion of the axle for vertical adjustment relative to the hay-stacker, and means for swinging the crank axle to raise and lower the hay-stacker, said means comprising a hand lever in the form of a single pivoted bar having its fulcrum end swingable on a pivot member which is rigidly related to the crank portion of the axle and closely adjacent thereto, said hand lever having locking means on the hay-stacker for holding the crank axle in such position that the hay-stacker is held off the ground.

2. A transport truck comprising a base frame, a crank axle journaled in said frame, supporting wheels journaled on the crank portion of said axle, a lifting arm fixed on said crank portion and extending radially therefrom, a hand lever for raising and lowering said wheels, said hand lever being pivoted on said arm on an axis transverse to the axle and movable from parallel to radial position relative to said axle, means on the arm for bracing the lever when the lever is swung into alinement with the arm for elevating said frame, and means on the base frame for locking said lever in position to hold the frame elevated.

3. In combination with a hay-stacker having a base frame, a transport device comprising a crank axle having its ends journaled in said base frame, ground wheels journaled upon the crank portion of said axle, a lever for raising and lowering one end of the hay-stacker, said lever being pivoted relative to the axle on an axis transverse thereto and adapted to extend radially therefrom, said lever serving to turn the axle so as to adjust the ground wheels relative to said base frame, and a latch on the frame movable into locking relation with the outer end of the lever to lock the axle in adjusted position when the axle has been turned to raise the frame.

4. A transport truck for hay-stackers comprising a ground engaging frame, a crank axle having its ends journaled in the frame, ground wheels journaled upon the crank portion of said axle, and means for swinging the crank portion of the axle to lift the frame from the ground, said means comprising an arm fixed to the axle and formed with a longitudinal groove in one side, a hand lever pivoted at its inner end to said arm so as to be located within said groove when the hand lever is swung to extend radially from said axle, and a latch device on the frame positioned so as to engage and lock said lever when the frame is in elevated position.

5. A transport device comprising, in combination, a support, a wheel for holding the support in elevated position, pivotal connections between the wheel and the support, an axle for the wheel, and means for moving the wheel relative to the support to lift the latter, said means comprising a lever movable to a radial position with respect to the wheel for elevating the support, and a rigidifying crank fixed on the axle and allowing the lever to swing to a substantially axial position when not used for lifting.

6. A transport device comprising, in combination, a support, a pintle carried by the support, a wheel eccentrically mounted with respect to the pintle, an axle for the wheel, a lever for elevating the support, and a connection for directly associating the lever with the axle so that the lever may be moved to radial position to elevate the support and to a substantially axial position when the support is lowered, said connection and the lever constituting a rigid crank extending from the axle when the support is being elevated.

In testimony whereof I affix my signature.

CHARLES PEARSON.